US011027688B2

(12) United States Patent
Price

(10) Patent No.: US 11,027,688 B2
(45) Date of Patent: Jun. 8, 2021

(54) SYSTEMS AND METHODS TO SUPPORT AN INFLATABLE AIRBAG CUSHION

(71) Applicant: Autoliv ASP, Inc., Ogden, UT (US)

(72) Inventor: Hazen Price, Syracuse, UT (US)

(73) Assignee: Autoliv ASP, Inc., Ogden, UT (US)

( * ) Notice: Subject to any disclaimer, the term of this patent is extended or adjusted under 35 U.S.C. 154(b) by 91 days.

(21) Appl. No.: 16/552,684

(22) Filed: Aug. 27, 2019

(65) Prior Publication Data
US 2021/0061213 A1  Mar. 4, 2021

(51) Int. Cl.
*B60R 21/231* (2011.01)
*B60R 21/205* (2011.01)
*B60R 21/00* (2006.01)

(52) U.S. Cl.
CPC .......... *B60R 21/231* (2013.01); *B60R 21/205* (2013.01); *B60R 2021/0044* (2013.01); *B60R 2021/0048* (2013.01); *B60R 2021/23123* (2013.01)

(58) Field of Classification Search
CPC ... B60R 21/231; B60R 21/205; B60R 21/206; B60R 2021/0048; B60R 2021/0044; B60R 2021/23169; B60R 2021/0051
USPC ............................................... 280/732, 743.1
See application file for complete search history.

(56) References Cited

U.S. PATENT DOCUMENTS

| | | |
|---|---|---|
| 5,044,663 A | 9/1991 | Seizert |
| 5,205,584 A | 4/1993 | Honda |
| 5,253,892 A | 10/1993 | Satoh |
| 5,362,101 A | 11/1994 | Sugiura et al. |
| 5,584,508 A * | 12/1996 | Maruyama ............ B60R 21/231 280/732 |
| 6,254,121 B1 | 7/2001 | Fowler et al. |
| 6,254,130 B1 | 7/2001 | Jayaraman et al. |
| 6,454,300 B1 | 9/2002 | Dunkle et al. |
| 6,857,659 B2 | 2/2005 | Webber |
| 7,350,807 B2 | 4/2008 | Schneider et al. |
| 7,377,548 B2 | 5/2008 | Bauer et al. |
| 7,506,892 B2 | 3/2009 | Klinkenberger et al. |
| 7,552,942 B2 | 6/2009 | Fischer et al. |
| 7,625,008 B2 | 12/2009 | Pang et al. |
| 7,631,895 B2 | 12/2009 | Kalliske et al. |
| 7,661,700 B2 | 2/2010 | Imamura et al. |
| 7,766,385 B2 | 8/2010 | Fukawatase et al. |
| 7,850,203 B2 | 12/2010 | Niwa et al. |

(Continued)

FOREIGN PATENT DOCUMENTS

DE    102007032763 A1    1/2008
DE    102012018450 A1    3/2014
(Continued)

OTHER PUBLICATIONS

International Search Report and Written Opinion dated Jul. 3, 2020 for international application PCT/US2020/033792.

*Primary Examiner* — Keith J Frisby
(74) *Attorney, Agent, or Firm* — Stoel Rives LLP

(57) ABSTRACT

Inflatable airbag assemblies are disclosed that include an inflatable airbag cushion that deploys rearward from an instrument panel and forward of a vehicle seating position and that include a forward-facing surface configured with a forward protrusion to engage a blind hole of an instrument panel, or a blind end of blind hole of the instrument panel, or blind hole of the instrument panel comprising a shelf.

16 Claims, 6 Drawing Sheets

(56) References Cited

U.S. PATENT DOCUMENTS

| | | |
|---|---|---|
| 7,862,073 B2 | 1/2011 | Thomas |
| 8,256,798 B2 | 9/2012 | Yamazaki |
| 8,308,188 B2 | 11/2012 | Kumagai et al. |
| 8,371,612 B2 | 2/2013 | Williams |
| 8,419,054 B2 | 4/2013 | Abe |
| 8,678,429 B2 | 3/2014 | Nagasawa et al. |
| 8,864,170 B2 | 10/2014 | Yamada et al. |
| 8,899,618 B2 | 12/2014 | Eckert et al. |
| 9,150,189 B1 | 10/2015 | Nelson et al. |
| 9,340,176 B2 | 5/2016 | Belwafa et al. |
| 9,434,344 B2 | 9/2016 | Fukawatase |
| 9,499,118 B2 | 11/2016 | Jindal et al. |
| 9,522,648 B2 | 12/2016 | Fukawatase |
| 9,623,831 B1 | 4/2017 | Deng et al. |
| 9,650,011 B1 | 5/2017 | Belwafa |
| 9,676,355 B2 | 6/2017 | Kruse |
| 9,676,362 B1 | 6/2017 | Deng et al. |
| 9,676,364 B2 | 6/2017 | Williams |
| 9,738,243 B2 | 8/2017 | Fukawatase et al. |
| 9,758,123 B2 | 9/2017 | Yamada et al. |
| 9,771,047 B2 | 9/2017 | Kruse et al. |
| 9,789,842 B2 | 10/2017 | Shin |
| 9,840,223 B2 | 12/2017 | Choi et al. |
| 9,845,067 B2 | 12/2017 | Morris et al. |
| 2004/0174003 A1 | 9/2004 | Dominissini |
| 2004/0256848 A1 | 12/2004 | Miyata et al. |
| 2005/0098994 A1 | 5/2005 | Matsumura |
| 2005/0110249 A1 | 5/2005 | Hasebe |
| 2005/0184489 A1 | 8/2005 | Kobayashi |
| 2006/0186647 A1 | 8/2006 | Bosch |
| 2006/0186656 A1 | 8/2006 | Kumagai |
| 2006/0279072 A1 | 12/2006 | Hanawa et al. |
| 2007/0108753 A1 | 5/2007 | Pang et al. |
| 2007/0210565 A1 | 9/2007 | Song et al. |
| 2008/0023943 A1 | 1/2008 | Kwon |
| 2009/0194981 A1 | 8/2009 | Mendez |
| 2009/0224522 A1 | 9/2009 | Fischer et al. |
| 2009/0302587 A1 | 12/2009 | Thomas |
| 2010/0032931 A1 | 2/2010 | Kumagai et al. |
| 2011/0140398 A1 | 6/2011 | Song et al. |
| 2012/0025505 A1 | 2/2012 | Abramoski et al. |
| 2013/0001934 A1 | 1/2013 | Nagasawa et al. |
| 2013/0055942 A1* | 3/2013 | Sekino ............ B60R 21/205 112/475.08 |
| 2014/0327234 A1 | 11/2014 | Heurlin et al. |
| 2015/0166002 A1 | 6/2015 | Fukawatase et al. |
| 2015/0367802 A1 | 12/2015 | Fukawatase et al. |
| 2016/0207490 A1 | 7/2016 | Yamada et al. |
| 2016/0250993 A1 | 9/2016 | Nagatani et al. |
| 2016/0280176 A1 | 9/2016 | Yamada |
| 2016/0311392 A1 | 10/2016 | Jindal et al. |
| 2017/0015266 A1 | 1/2017 | El-Jawahri et al. |
| 2017/0088080 A1 | 3/2017 | Hotta et al. |
| 2017/0088087 A1 | 3/2017 | Williams |
| 2017/0129444 A1 | 5/2017 | Fukawatase et al. |
| 2017/0136981 A1 | 5/2017 | Fukawatase et al. |
| 2017/0166159 A1 | 6/2017 | Shin |
| 2017/0253212 A1 | 9/2017 | Choi et al. |
| 2017/0355341 A1 | 12/2017 | Keyser et al. |
| 2017/0355344 A1 | 12/2017 | Choi et al. |
| 2018/0086298 A1 | 3/2018 | Nakanishi et al. |
| 2018/0111581 A1 | 4/2018 | Wang et al. |

FOREIGN PATENT DOCUMENTS

| | | |
|---|---|---|
| DE | 102015004956 A1 | 10/2016 |
| JP | H0332956 A | 2/1991 |
| JP | H1148906 A | 2/1999 |
| JP | 2006088856 A | 4/2006 |
| JP | 2008044594 A | 2/2008 |
| JP | 2011225139 A | 11/2011 |
| JP | 5491332 B2 | 3/2012 |
| JP | 5408268 B2 | 2/2014 |
| JP | 5483568 B2 | 5/2014 |
| JP | 2014237382 A | 12/2014 |
| WO | 2008063103 A1 | 5/2008 |
| WO | 2016147732 A1 | 9/2016 |

* cited by examiner

SYSTEMS AND METHODS TO SUPPORT AN INFLATABLE AIRBAG CUSHION

TECHNICAL FIELD

The present disclosure relates generally to the field of automotive protective systems. More specifically, the present disclosure relates to frontal airbag systems that are configured to deploy in response to frontal collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1A:
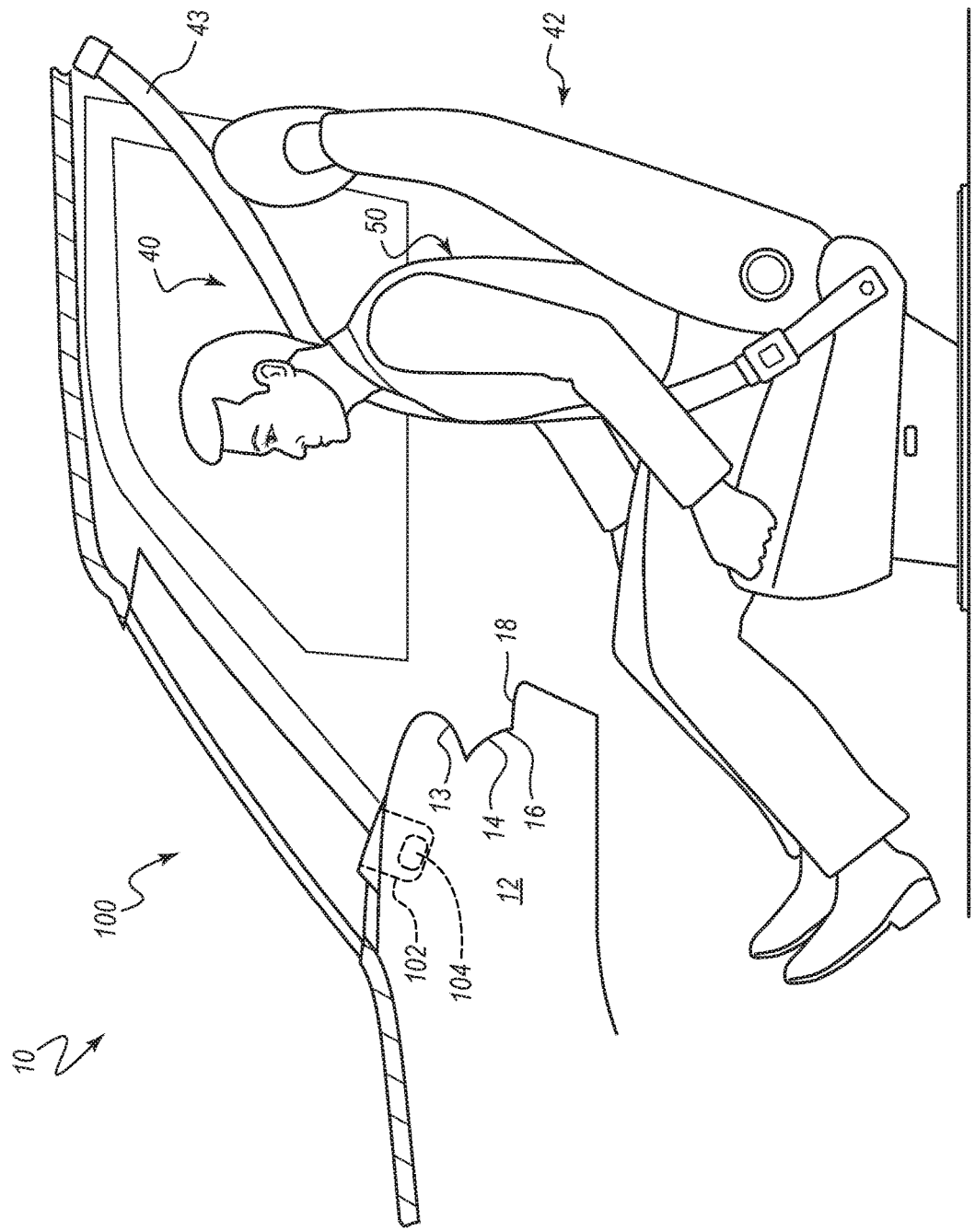
FIG. 1A is a side view of a portion of an interior of a vehicle equipped with an inflatable airbag system, according to an embodiment of the present disclosure.

The present disclosure is directed toward supporting an inflatable airbag cushion. More particularly, the invention provides a repeatable and predictable means of supporting the inflatable airbag cushion, typically a passenger airbag in a vehicle having a shelf-like structure at an instrument panel.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

As used herein, the terms "dashboard" and "instrument panel" refer to a feature of an interior of a motor vehicle disposed in a cab-forward location facing rearward to be faced by a motor vehicle occupant, which often includes a glove compartment or a shelf-like region in a portion thereof that faces a passenger and may include instruments (e.g., radio and/or climate controls) in a more central region thereof, although such instruments need not be present. In at least some instances industry-wide, the terms dashboard and instrument panel may be used interchangeably. For the present disclosure, the term instrument panel circumscribes such instances, as well as instances wherein the two terms have distinct meanings.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

Inflatable airbag assemblies are widely used to reduce or minimize occupant injury during a collision event. An inflatable airbag cushion of an inflatable airbag assembly used in a vehicle should perform reliably, predictably, and in a repeatable manner. Although vehicle surfaces which may support or interact with an inflatable airbag cushion may vary from vehicle model to model, the inflatable airbag cushion must be able to perform in a consistent, repeatable manner. For a vehicle with an instrument panel having a shelf-like structure, an inflatable airbag cushion may not perform in a repeatable manner due to inadequate support of a portion of a forward aspect of the inflatable airbag cushion.

During installation, airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

The expanding airbag cushion may be supported by, and directionally influenced by, various surfaces of the vehicle, including an upper surface of the instrument panel, a rearward-facing surface of the instrument panel, formations (e.g., voids, cavities) within the surface of the instrument panel, etc. An airbag assembly can mitigate injury to an occupant of a vehicle during a collision event by reducing the effect of impact of the occupant against structures (body-structure impact) within the vehicle (such as, e.g., a dashboard or door column). Deviations (e.g., particular voids or cavities, of an instrument panel, such as a shelf-like structure or receptacle) may present a region which offers inadequate or no support for a portion of the inflatable airbag cushion. As a result, the inflatable airbag cushion may not deploy in a consistent manner to receive an occupant so as to reduce or minimize injury.

Some embodiments disclosed herein can provide improved positioning, cushioning, and/or safety to occupants involved in particular types of collisions. For example, some embodiments can be configured to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

Figure 1B:
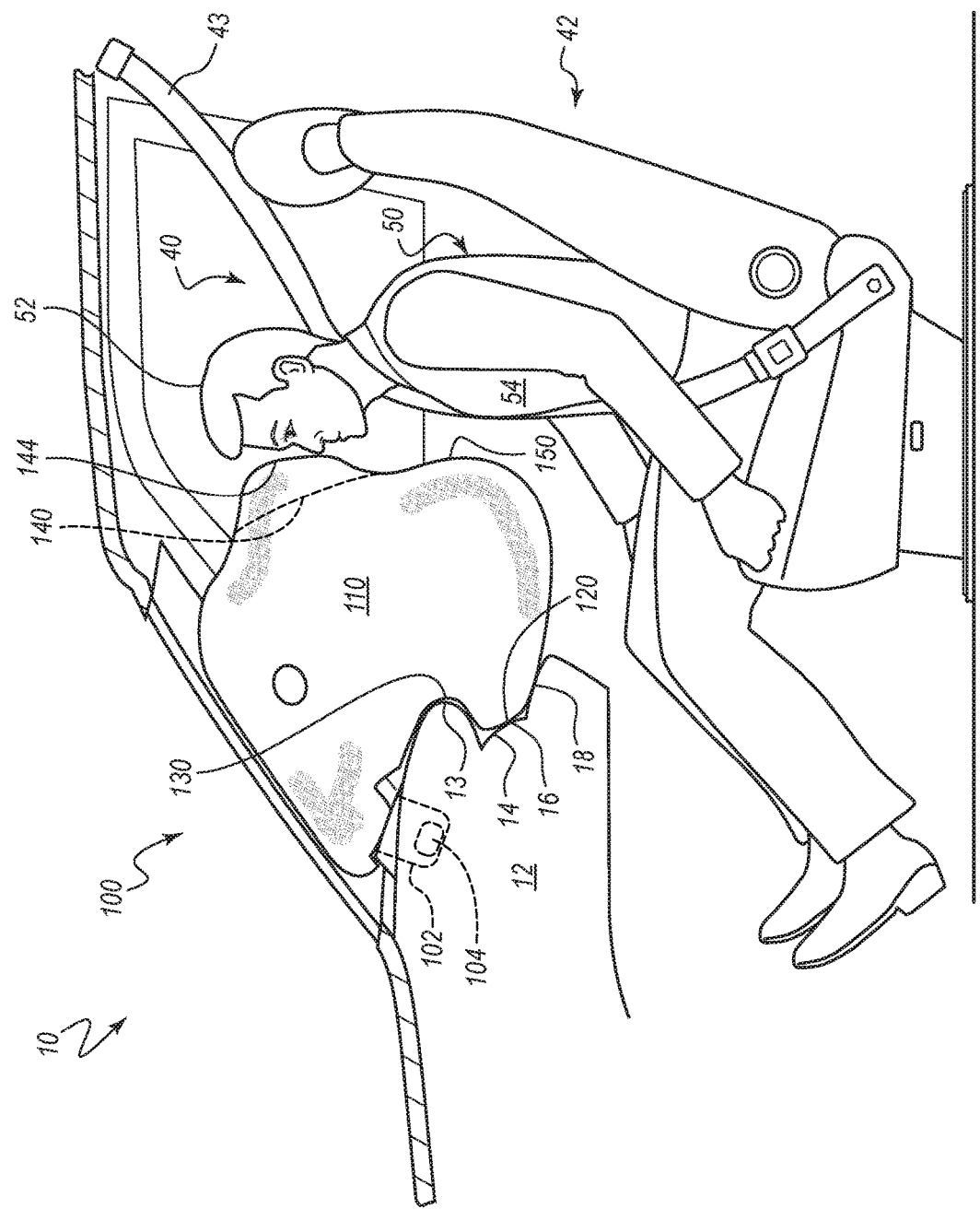
FIG. 1B is a side view of a portion of the interior of the vehicle of FIG. 1A with the inflatable airbag system in a deployed state.
Figure 1C:
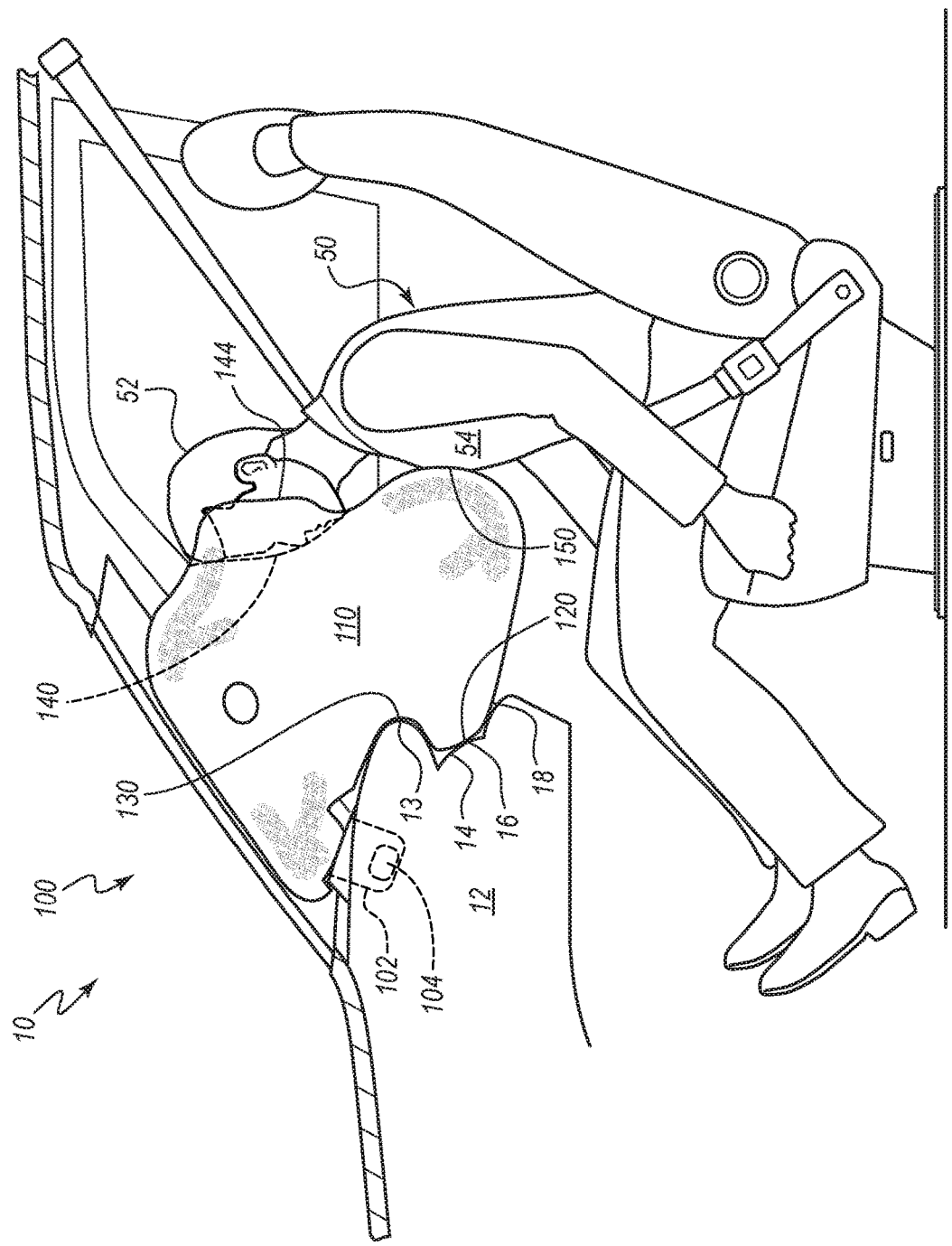
FIG. 1C is a side view of a portion of the interior of the vehicle of FIG. 1A with the inflatable airbag system in a deployed state and supporting the occupant.

FIG. 1A is a side view of a portion of an interior of a vehicle 10 equipped with an inflatable airbag system 100, according to an embodiment of the present disclosure. The vehicle 10 comprises an instrument panel 12 and a vehicle seating position 40 disposed rearward of the dashboard. The vehicle seating position 40 may be defined by a seat 42 (e.g., a front passenger seat, a front driver seat, a back seat) of a vehicle and may be a position in which an occupant is generally positioned when seated in a seat of a vehicle. The vehicle seating position 40 may be the position in which the vehicle 10 and/or the seat 42 is designed to transport an occupant 50 and/or a position in which an occupant 50 may be seated prior to and/or during a collision event. The vehicle seating position 40 comprises a seat 42 and a seat belt harness 43. An occupant 50 is shown occupying the vehicle seating position 40. The instrument panel 12 comprises a reaction surface 13 and a blind hole 14. The blind hole 14 is a cavity within a portion of the instrument panel 12, generally, within a rearward-facing portion of the instrument panel 12. The cavity is open toward a rearward area and is at least partially closed toward a forward aspect of the instrument panel 12. By way of example without limitation, the blind hole 14 may be a doorless glove box. In the embodiment of FIG. 1A, the blind hole 14 is defined by a blind end 16 and a shelf 18. The blind end 16 is a forward portion of the blind hole 14 disposed generally opposite the open end or side of the blind hole 14. The shelf 18 is a portion of the instrument panel 12 below an upper surface of the instrument panel forming a generally horizontal region of a rearward portion of the instrument panel. A shelf may define a lower extent of a recess. A shelf may define a blind hole or a portion of a blind hole of an instrument panel. While the embodiment of FIGS. 1A-1C shows a blind end 16 with a shelf 18, this is for convenience of the disclosure and not by way of limitation a blind hole 14 with a blind end 16 and a shelf 18 is but one configuration of the instrument panel 12 anticipated by the disclosure. Generally, a blind hole 14 or a shelf 18 may extend laterally along at least a portion of the instrument panel 12.

In the illustrated embodiment of FIG. 1A, the inflatable airbag system 100 is disposed within a housing 102 at an upper and forward aspect of the instrument panel 12. The inflatable airbag system 100 may include an inflator 104.

FIG. 1B is a side view of a portion of the interior of the vehicle 10 of FIG. 1A with the inflatable airbag system 100 in a deployed state. The vehicle seating position 40, the seat 42, and the seat belt harness 43 are shown for reference, as is the occupant 50. A head 52 and torso 54 of the occupant 50 are also identified for reference. An inflatable airbag cushion 110 is shown at least partially deployed and inflated by operation of the inflator 104. The inflatable airbag cushion 110 comprises a forward-facing surface 130 (e.g., a reaction surface interface), a forward protrusion 120, a central receiving area 140, and a torso receiving area 150. The forward protrusion 120 projects from the forward-facing surface 130 of the inflatable airbag cushion 110.

The forward protrusion 120 of the inflatable airbag cushion 110 is shaped and otherwise configured to occupy a substantial portion of the blind hole 14 defined by the blind end 16 and shelf 18 in the instrument panel 12. In other words, the forward protrusion 120 may be configured to substantially mirror the blind hole 14, or the shelf 18. More particularly, the forward protrusion 120 may be configured to conform to a shape of the blind hole 14. The forward protrusion 120 may be restricted to a bottom or lower portion of a forward-facing surface 130 of the inflatable airbag cushion 110. In one embodiment, the forward protrusion 120 may extend along an entire width of a forward-facing surface 130 of the inflatable airbag cushion 110. In one embodiment, the instrument panel 12 may comprise a plurality of blind holes 14 and the inflatable airbag cushion 110 may comprise a plurality of protrusions spaced along the width of the forward-facing surface 130 of the inflatable airbag cushion 110 to conform to the plurality of blind holes 14 of the instrument panel 12. In one embodiment, the forward protrusion 120 may protrude directly forward from a lower portion of the inflatable airbag cushion 110 in a deployed condition. In one embodiment, the forward protrusion 120 may be angled downward and forward from the inflatable airbag cushion 110 in a deployed condition. The forward protrusion 120 may project three centimeters or more from a portion of the forward-facing surface 130 of the inflatable airbag cushion 110 in a deployed condition. The forward protrusion 120 may be configured to engage the blind end 16 of the blind hole 14 whereby the blind end 16 may function as an additional reaction surface supporting the inflatable airbag cushion 110. In other words, the forward protrusion 120 at least partly contacts the blind end 16 of the blind hole 14.

A portion of the forward-facing surface 130 may be configured to interact with the instrument panel 12, such that the instrument panel 12 provides a reaction surface 13 against which the forward-facing surface 130 reacts. The forward-facing surface 130 may engage the reaction surface 13 in a manner to dispose the inflatable airbag cushion 110 to receive the occupant 50 during a collision event. For example, during inflation, the forward-facing surface 130 may cause the inflatable airbag cushion 110 to achieve an orientation with the central receiving area 140 and torso receiving area 150 properly disposed to receive the head 52 and/or torso 54 of the occupant 50. The forward-facing surface 130 may also provide particular support by engaging the reaction surface 13 as the inflatable airbag cushion 110 becomes loaded by receiving the head 52 and/or torso 54 of the occupant 50 during a collision event. The forward protrusion 120 may be configured to engage a substantial lateral width of the blind end 16 of the blind hole 14 whereby the forward protrusion 120 may stabilize the inflatable airbag cushion 110 against lateral rotation or oscillation as the inflatable airbag cushion 110 inflates and becomes loaded by receiving the head 52 and/or torso 54 of the occupant 50.

The central receiving area 140 may be disposed in an upper portion of a rearward-facing surface of the inflatable airbag cushion 110. A pair of lobes 144 (and 142 in FIG. 2) may be disposed adjacent the central receiving area 140, with one lobe to either side of the central receiving area 140. The central receiving area 140 may be particularly configured to receive and cushion the head 52 of the occupant 50 in a collision event. The lobes 142, 144 may provide protection for the head 52 of the occupant, in particular, in an oblique collision event. The torso receiving area 150 may be disposed below the central receiving area 140, or may be a lower portion of the central receiving area 140. The torso receiving area 150 may be configured to receive and support the torso 54 of the occupant 50 during a collision event.

FIG. 1C is a side view of a portion of the interior of the vehicle 10 of FIG. 1A with the inflatable airbag system 100 in a deployed state and supporting the occupant 50. The instrument panel 12, the housing 102, and the inflator 104 are shown for reference. The occupant 50 has engaged the rearward-facing surface of the inflatable airbag cushion 110, with the head 52 at the central receiving area 140, and the torso 54 at the torso receiving area 150. The lobes 144 (and 142 in FIG. 2) may provide particular support for the head 52 of the occupant 50 in an oblique collision event. With the occupant 50 engaged against and supported by the inflatable airbag cushion 110, the inflatable airbag cushion 110 is supported at least partially by the instrument panel 12. The forward-facing surface 130 may at least partially support the inflatable airbag cushion 110 by engaging the reaction surface 13 of the instrument panel 12. More particularly, the forward protrusion 120 engages and/or is supported by the blind end 16 and/or shelf 18 of the blind hole 14 in the instrument panel 12. In other words, the forward protrusion 120 at least partly contacts the blind end 16 and/or shelf 18 of the blind hole 14. The forward protrusion 120, by engaging the blind end 16 and/or shelf 18 of the blind hole 14, may produce repeatably reliable support for the inflatable airbag cushion 110 during a collision event. In other words, the forward protrusion 120 may limit or prevent instability of the inflatable airbag cushion 110 as the occupant 50 engages the inflatable airbag cushion 110. Instability of the inflatable airbag cushion 110 may reduce the effectiveness of the inflatable airbag cushion 110 in protecting the occupant 50 during a collision event.

Figure 2:
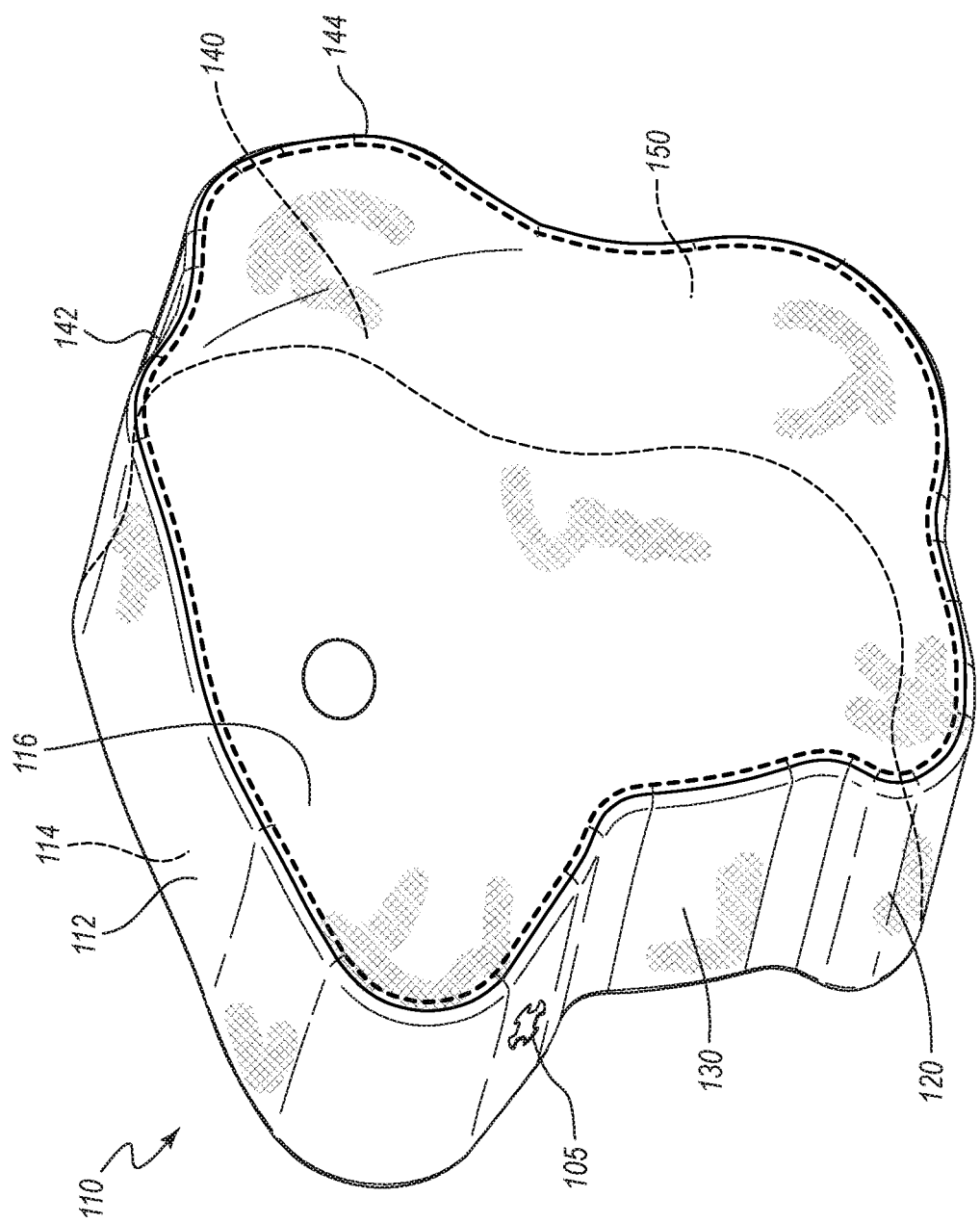
FIG. 2 is a perspective view of an inflatable airbag cushion at least partially inflated, according to an embodiment of the present disclosure

FIG. 2 is a perspective view of the inflatable airbag cushion 110 of FIGS. 1B-1C at least partially inflated. The inflatable airbag cushion 110 comprises a central panel 112, a first lateral panel 114, and a second lateral panel 116. The forward protrusion 120, the forward-facing surface 130, the central receiving area 140, and the torso receiving area 150 are shown for reference. A first lobe 142 is disposed adjacent the central receiving area 140 and toward the first lateral panel 114 and a second lobe 144 is disposed adjacent the central receiving area 140 and toward the second lateral panel 116. The first and second lateral panels 114, 116 are substantially symmetric to each other in the assembled inflatable airbag cushion 110. As can be appreciated, in other embodiments the first and second lateral panels 114, 116 may lack symmetry to each other.

A port 105 is disposed on a forward portion of the inflatable airbag cushion 110 and, more particularly, in a portion of the central panel 112. The port 105 may be configured to accommodate or direct inflation gas from the inflator (see 104 in FIGS. 1A-1C) to an interior of the assembled inflatable airbag cushion 110.

In the illustrated embodiment, the forward protrusion 120 extends along an entire width of the forward-facing surface 130 from a first lateral edge to a second lateral edge. As mentioned previously, the forward protrusion 120 is shaped or otherwise configured to engage and/or abut against (to be supported by) a blind end and/or shelf of a blind hole of an instrument panel. The forward protrusion 120, by engaging the blind end and/or shelf of a blind hole may produce predictable and/or repeatably reliable support for the inflatable airbag cushion 110 during a collision event. In other words, the forward protrusion 120 may limit or prevent instability of the inflatable airbag cushion 110 during engagement and ridedown of an occupant during a collision event. Improving stability (or reducing the instability) of the inflatable airbag cushion 110 may enhance effectiveness of the inflatable airbag cushion 110 in protecting an occupant during a collision event.

Figure 3:
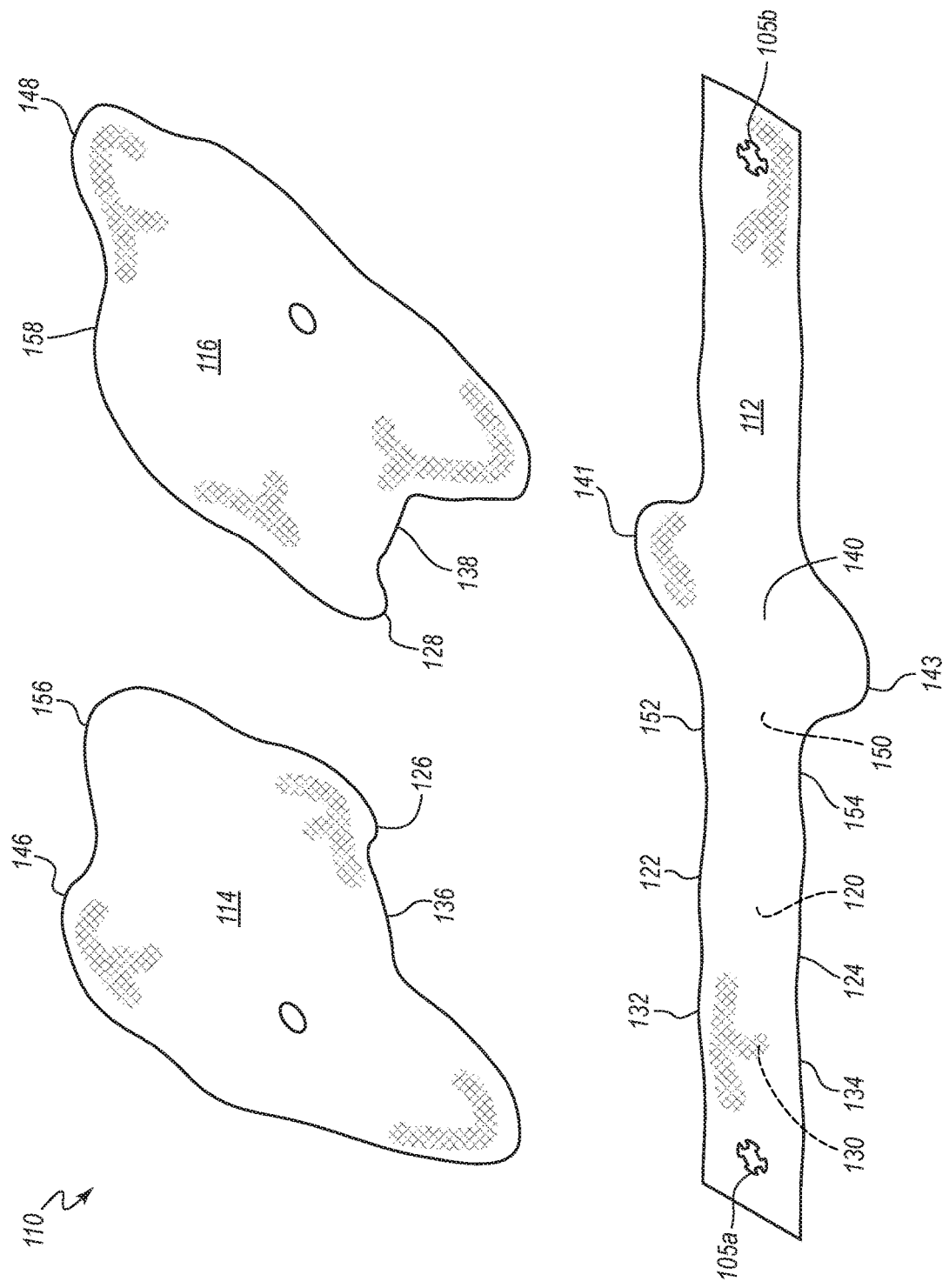
FIG. 3 shows an inflatable airbag cushion in a preassembled state, according to an embodiment of the present disclosure.

FIG. 3 illustrates the inflatable airbag cushion 110 of FIG. 2 in a preassembled state. The central panel 112, first lateral panel 114, and second lateral panel 116 are shown as individual components in a flat condition. The central panel 112 of the embodiment of FIG. 3 is configured to provide the forward-facing surface 130, the forward protrusion 120, the torso receiving area 150, and the central receiving area 140. The port 105 (shown in FIG. 2) comprises a first inflation port 105a and a second inflation port 105b disposed toward opposite longitudinal ends of the central panel 112, as shown in FIG. 3. The first inflation port 105a and second inflation port 105b are configured to overlie each other in an assembled configuration. The central panel 112 includes a first forward-facing surface edge 132 and a second forward-facing surface edge 134 disposed at laterally opposite sides of the forward-facing surface 130. The central panel 112 includes a first forward protrusion edge 122 and a second forward protrusion edge 124 disposed at laterally opposite sides of the forward protrusion 120. The central panel 112 includes a first torso receiving area edge 152 and a second torso receiving area edge 154 disposed at laterally opposite sides of the torso receiving area 150. The central panel 112 includes a first lobe edge 141 and a second lobe edge 143 disposed at laterally opposite sides of the central receiving area 140.

The first lateral panel 114 comprises a third forward-facing surface edge 136, a third forward protrusion edge 126, a third torso receiving area edge 156, and a third lobe edge 146 disposed about the perimeter of the first lateral panel 114. The first lateral panel 114 is configured to couple about its perimeter to a lateral side of the central panel 112. More particularly, the third forward-facing surface edge 136 is configured to couple with the first forward-facing surface edge 132 of the central panel 112. Similarly, the third forward protrusion edge 126 is configured to couple with the first forward protrusion edge 122, the third torso receiving area edge 156 is configured to couple with the first torso receiving area edge 152, and the third lobe edge 146 is configured to couple with first lobe edge 141.

The second lateral panel 116 generally mirrors the first lateral panel 114 and comprises a fourth forward-facing surface edge 138, a fourth forward protrusion edge 128, a fourth torso receiving area edge 158, and a fourth lobe edge 148 disposed about the perimeter of the second lateral panel 116. The second lateral panel 116 is configured to couple about its perimeter to a lateral side of the central panel 112 and opposite the first lateral panel 114. More particularly, the fourth forward-facing surface edge 138 is configured to couple with the second forward-facing surface edge 134 of the central panel 112. Similarly, the fourth forward protrusion edge 128 is configured to couple with the second forward protrusion edge 124, the fourth torso receiving area edge 158 is configured to couple with the second torso receiving area edge 154, and the fourth lobe edge 148 is configured to couple with the second lobe edge 143.

The first and second lateral panels 114, 116, as well as the central panel 112, may be configured such that coupling of first lobe edge 141 and third lobe edge 146 forms a lobe (see the lobe 142 in FIG. 2) disposed toward a lateral side of the central receiving area 140, and coupling of the second lobe edge 143 and the fourth lobe edge 148 forms a lobe (see the lobe 144 in FIG. 2) disposed toward an opposite lateral side of the central receiving area 140.

The first and second lateral panels 114, 116 may couple to the central panel 112 by seams. The central panel 112 may couple to itself by seams near or about the first and second inflation ports 105a, 105b. Seams may be formed by sewing, radio-frequency welding, gluing, adhesive, or any other appropriate means, or a plurality of appropriate means. Furthermore, a seam may be formed by different means at various locations along the seam.

Figure 4:
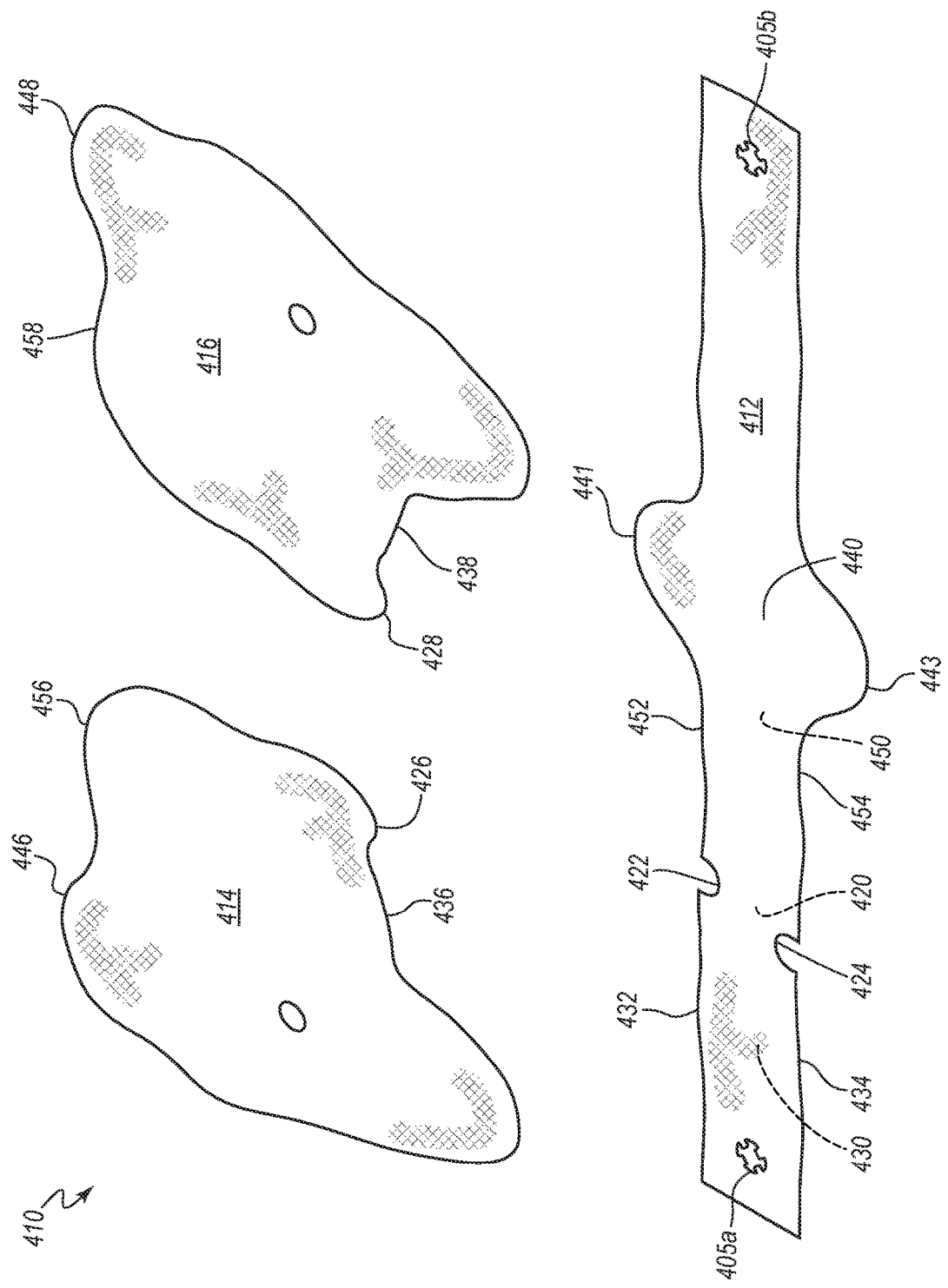
FIG. 4 shows an inflatable airbag cushion in a preassembled state, according to an embodiment of the present disclosure.

FIG. 4 is a perspective of an inflatable airbag cushion 410 similar in many respects to the inflatable airbag cushion 110 of FIGS. 1A, 1B, 1C, 2, and 3 and in a preassembled state. A central panel 412, a first lateral panel 414, and a second lateral panel 416 are shown. The central panel 412 comprises first and second inflation ports 405a, 405b corresponding to the first and second inflation ports 105a, 105b of FIG. 3. The central panel 412 further comprises a forward-facing surface 430, a forward protrusion 420, a torso receiving area 450, and a central receiving area 440, each corresponding, respectively, to the forward-facing surface 130, the forward protrusion 120, the torso receiving area 150, and the central receiving area 140 of FIG. 3. Similarly, the central panel 412 comprises first and second forward-facing surfaces 432, 434, first and second torso receiving area edges 452, 454, and first and second lobe edges 441, 443 corresponding, respectively, to the first and second forward-facing surfaces 132, 134, the first and second torso receiving area edges 152, 154, and the first and second lobe edges 141, 143 of FIG. 3. The central panel 412 further comprises first and second forward protrusion edges 422, 424 approximately corresponding to the first and second forward protrusion edges 122, 124 of FIG. 3. While the first and second forward protrusion edges 122, 124 of FIG. 3 lie in a generally straight line along an edge of the central panel 112 of FIG. 3, the first and second protrusion edges 422, 424 each define an arcuate form impinging toward the forward protrusion 420.

The first lateral panel 414 comprises a third forward-facing surface edge 436, a third forward protrusion edge 426, a third torso receiving area edge 456, and a third lobe edge 446 corresponding to the third forward-facing surface edge 136, the third forward protrusion edge 126, the third torso receiving area edge 156, and the third lobe edge 146 of the first lateral panel 114 of FIG. 3. The second lateral panel 416 similarly comprises a fourth forward-facing surface edge 438, a fourth forward protrusion edge 428, a fourth torso receiving area edge 458, and a fourth lobe edge 448 corresponding to the fourth forward-facing surface edge 138, the fourth forward protrusion edge 128, the fourth torso receiving area edge 158, and the fourth lobe edge 148 of the second lateral panel 116 of FIG. 3.

The first and second lateral panels 414, 416 couple to the central panel 412 similarly as described for the corresponding first and second lateral panels 114, 116, and central panel 112 of FIG. 3. In at least one embodiment, the arcuate form of the first and second forward protrusion edges 422, 426 may define a form or shape of the forward protrusion 420 in the assembled state distinct from that formed in the assembly of the components of FIG. 3. The arcuate form of the first and second forward protrusion edges 422, 424 may define a laterally narrower forward protrusion 420. A laterally narrower forward protrusion 420 may be desirable to conform to a given configuration of a blind hole.

In one embodiment, the first forward protrusion edge 422 may be generally straight (similar to the first forward protrusion edge 122 of FIG. 3), while the second forward protrusion edge 424 may be arcuate, whereby another particular configuration of the forward protrusion 420 is defined to accommodate a given blind hole configuration. Similarly, the first forward protrusion edge 422 may be arcuate and the second forward protrusion edge 424 may be generally straight. In another embodiment, either or both of the first and second forward protrusion edges 422, 424 may be arcuate at different degrees, or different distances to define a particular form of the forward protrusion 420 for a desired application. In one embodiment, an arcuate form of one of the first and second forward protrusion edges 422, 424 may be reversed so as to laterally expand a portion of the central panel 412 whereby a particular form of the forward protrusion 420 may be defined. In one embodiment, the third forward protrusion edge 426, or the fourth forward protrusion edge 428, or both, may be altered to further accommodate a desired form definition of the forward protrusion 420. Other configurations of the first and second forward protrusion edges 422, 424, as well as the third and fourth forward protrusion edges 426, 428, and the forward protrusion 420 are anticipated by the disclosure.

In one embodiment, that portion of the central panel 412 generally between the first and second forward protrusion edges 422, 424, along with the third and fourth forward protrusion edges 426, 428 may be configured to define a plurality of protrusions that are spaced along the width of the forward-facing surface 430 of the inflatable airbag cushion 410. In other words, a portion of the central panel 412 generally conforming to the forward protrusion 420 may comprise one or more seams, apertures having edges to couple with one or more additional panels, or other means whereby a plurality of forward protrusions may be defined so as to engage (at least partly contact) blind ends of multiple blind holes.

Reference throughout the disclosure to "one embodiment," "an embodiment," or "the embodiment" means that a given feature, structure, or characteristic described in connection with that embodiment is included in at least one embodiment. The quoted phrases, or variations thereof, as recited throughout this disclosure are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. Embodiments of the disclosure in which an exclusive property or privilege is claimed are defined as expressed herein.

Example 1. An inflatable airbag cushion comprising a rearward-facing surface to be positioned forward of a vehicle seating position for receiving one or more of a head and a torso of an occupant in a forward direction during a collision event; and a forward-facing surface comprising a protrusion, wherein the forward-facing surface is configured to engage an instrument panel, wherein the protrusion is configured to at least conform to and partially fill a blind hole disposed on the instrument panel, and wherein the protrusion is configured to engage a blind end of the blind hole.

Example 2. The inflatable airbag cushion of example 1, wherein the protrusion is restricted to a bottom portion of the forward-facing surface of the inflatable airbag cushion.

Example 3. The inflatable airbag cushion of example 1, wherein the protrusion extends along an entire width of the forward-facing surface from a first lateral edge to a second lateral edge.

Example 4. The inflatable airbag cushion of example 1, wherein the forward-facing surface comprises a plurality of protrusions that are spaced along the width of the forward-facing surface.

Example 5. The inflatable airbag cushion of example 1, wherein the protrusion is angled downward and forward in a deployed configuration of the inflatable airbag cushion.

Example 6. The inflatable airbag cushion of example 1, wherein the protrusion projects at least three centimeters from the forward-facing surface.

Example 7. The inflatable airbag cushion of example 1, wherein the rearward-facing surface comprises a pair of lobes disposed on opposing sides of a central receiving area, wherein the central receiving area is configured to receive a head of the occupant during a collision event.

Example 8. An airbag deployment system comprising an instrument panel comprising a blind hole, wherein the instrument panel houses an inflatable airbag assembly, the inflatable airbag assembly comprising an inflatable airbag cushion comprising a rearward-facing surface to be positioned forward of a vehicle seating position for receiving one or more of a head or a torso of an occupant in a forward direction during a collision event, and a forward-facing surface comprising a protrusion, wherein the forward-facing surface is configured to engage the instrument panel, wherein the protrusion is configured to conform to and partially fill the blind hole of the instrument panel, and wherein the protrusion is configured to engage a blind end of the blind hole.

Example 9. The airbag deployment system of example 8, wherein the blind hole of the instrument panel is a shelf that extends laterally along the instrument panel.

Example 10. The airbag deployment system of example 8, wherein a width and a depth of the protrusion substantially mirror the blind hole of the instrument panel.

Example 11. The airbag deployment system of example 8, wherein the instrument panel comprises a plurality of blind holes, and wherein the inflatable airbag assembly comprises a plurality of protrusions, wherein each protrusion of the inflatable airbag assembly conforms to one of the plurality of blind holes of the instrument panel.

Example 12. The airbag deployment system of example 8, wherein the protrusion is restricted to a bottom portion of the forward-facing surface of the inflatable airbag cushion.

Example 13. The airbag deployment system of example 8, wherein the protrusion extends along an entire width of the forward-facing surface from a first lateral edge to a second lateral edge.

Example 14. The airbag deployment system of example 8, wherein the forward-facing surface comprises a plurality of protrusions that are spaced along the width of the forward-facing surface.

Example 15. The airbag deployment system of example 8, wherein the protrusion is angled downward and forward in a deployment of the inflatable airbag cushion.

Example 16. The airbag deployment system of example 8, wherein the protrusion projects at least three centimeters from the forward-facing surface.

Example 17. The airbag deployment system of example 8, wherein the rearward-facing surface comprises a pair of lobes disposed on opposing sides of the central receiving area, wherein the central receiving area is configured to receive the head of the occupant during a collision event.

Example 18. An inflatable airbag cushion comprising a central panel comprising a substantially rectangular shape; a pair of side panels that each couples to an edge of the central panel, each side panel of the pair of side panels including an edge that extends outward from the side panel in a forward-facing surface of the inflatable airbag cushion, wherein opposing lateral edges of the central panel at least partially couple to one of the pair of side panels, and wherein the edge of each of the pair of side panels that extends outward from the side panel forms a protrusion that is configured to conform to and partially fill a blind hole of an instrument panel, and wherein the protrusion is configured to engage a blind end of the blind hole.

Example 19. The inflatable airbag cushion of example 18, wherein the opposing lateral edges of the central panel couple to the side panel along the entire edge of each of the pair of side panels.

Example 20. The inflatable airbag cushion of example 18, wherein the central panel comprises a pair of cutouts that couple to the edges that extend outward from the side panel.

What is claimed is:

1. An inflatable airbag cushion comprising:
   a central panel comprising a substantially rectangular shape;
   a pair of side panels that each couple to an edge of the central panel, each side panel of the pair of side panels including an edge that includes a portion that protrudes from the side panel in a forward direction,
   a rearward-facing surface to be positioned forward of a vehicle seating position for receiving one or more of a head and a torso of an occupant in a forward direction during a collision event; and
   a forward-facing surface and a protrusion that projects from the forward-facing surface, wherein the forward-facing surface is configured to engage an instrument panel and the protrusion is configured to at least partially conform to and partially fill a blind hole disposed on the instrument panel, and wherein the protrusion is configured to engage a blind end of the blind hole,
   wherein opposing lateral edges of the central panel each at least partially couple to one of the pair of side panels, wherein the edge of each of the pair of side panels that protrudes forward from the side panel forms the protrusion, and wherein the central panel comprises a pair of cutouts that couple to edges that extend outward from the side panel.

2. The inflatable airbag cushion of claim 1, wherein the protrusion is disposed at a bottom portion of the forward-facing surface of the inflatable airbag cushion.

3. The inflatable airbag cushion of claim 1, wherein the protrusion extends along an entire width of the forward-facing surface from a first lateral edge to a second lateral edge.

4. The inflatable airbag cushion of claim 1, wherein the protrusion is angled downward and forward in a deployed configuration of the inflatable airbag cushion.

5. The inflatable airbag cushion of claim 1, wherein the protrusion projects at least three centimeters from the forward-facing surface.

6. The inflatable airbag cushion of claim 1, wherein the rearward-facing surface comprises a pair of lobes disposed on opposing sides of a central receiving area that is configured to receive the head of the occupant during the collision event.

7. An airbag deployment system comprising:
an instrument panel comprising a blind hole;
an inflatable airbag assembly housed within the instrument panel, the inflatable airbag assembly comprising an inflatable airbag cushion comprising:
a rearward-facing surface to be positioned forward of a vehicle seating position for receiving one or more of a head or a torso of an occupant in a forward direction during a collision event; and
a forward-facing surface comprising a protrusion, wherein the forward-facing surface is configured to engage the instrument panel, wherein the protrusion is configured to conform to and partially fill the blind hole of the instrument panel, and wherein the protrusion is configured to engage a blind end of the blind hole.

8. The airbag deployment system of claim 7, wherein the blind hole extends laterally along the instrument panel.

9. The airbag deployment system of claim 7, wherein a width and a depth of the protrusion substantially mirror the blind hole of the instrument panel.

10. The airbag deployment system of claim 7, wherein the protrusion is restricted to a bottom portion of the forward-facing surface of the inflatable airbag cushion.

11. The airbag deployment system of claim 7, wherein the protrusion extends along an entire width of the forward-facing surface from a first lateral edge to a second lateral edge.

12. The airbag deployment system of claim 7, wherein the protrusion is angled downward and forward in a deployed configuration of the inflatable airbag cushion.

13. The airbag deployment system of claim 7, wherein the protrusion projects at least three centimeters from the forward-facing surface.

14. The airbag deployment system of claim 7, wherein the rearward-facing surface comprises a pair of lobes disposed on opposing sides of a central receiving area, wherein the central receiving area is configured to receive the head of the occupant during the collision event.

15. An inflatable airbag cushion comprising:
a central panel comprising a substantially rectangular shape;
a pair of side panels that each couple to an edge of the central panel, each side panel of the pair of side panels including an edge that includes a portion that protrudes from the side panel in a forward direction,
wherein opposing lateral edges of the central panel each at least partially couple to one of the pair of side panels,
wherein the edge of each of the pair of side panels that protrudes forward from the side panel forms a protrusion that is configured to conform to and partially fill a blind hole of an instrument panel,
wherein the protrusion is configured to engage a blind end of the blind hole, and
wherein the central panel comprises a pair of cutouts that couple to edges that extend outward from the side panel.

16. The inflatable airbag cushion of claim 15, wherein the opposing lateral edges of the central panel couple to the side panel along the entire edge of each of the pair of side panels.

* * * * *